US011782413B2

(12) United States Patent
Crystal et al.

(10) Patent No.: US 11,782,413 B2
(45) Date of Patent: Oct. 10, 2023

(54) ELECTRONIC CUTTING MACHINE

(71) Applicant: Cricut, Inc., South Jordan, UT (US)

(72) Inventors: Jeremy Crystal, Springville, UT (US); Jeffery V. Gubler, Orem, UT (US); Clark L. Roper, North Highland, UT (US); James T. Davis, II, Springville, UT (US); Jim Colby, Highland, UT (US); Daniel Torgerson, Stansbury Park, UT (US); Alan Romig, Stansbury Park, UT (US); Steven Bandis, West Jordan, UT (US); Matthew Waibel, Sandy, UT (US); Robert Woldberg, Centerville, UT (US); Don Olsen, Springville, UT (US); Matthew L. Tuttle, Lehi, UT (US)

(73) Assignee: Cricut, Inc., South Jordan, UT (US)

( * ) Notice: Subject to any disclaimer, the term of this patent is extended or adjusted under 35 U.S.C. 154(b) by 97 days.

(21) Appl. No.: 17/484,050

(22) Filed: Sep. 24, 2021

(65) Prior Publication Data

US 2022/0011737 A1    Jan. 13, 2022

Related U.S. Application Data

(63) Continuation of application No. 14/768,405, filed as application No. PCT/US2014/017524 on Feb. 20, 2014, now Pat. No. 11,131,980.
(Continued)

(51) Int. Cl.
*G05B 19/402* (2006.01)
*B26D 5/00* (2006.01)
(Continued)

(52) U.S. Cl.
CPC .......... *G05B 19/402* (2013.01); *B26D 5/005* (2013.01); *B26D 5/086* (2013.01); *B26D 5/32* (2013.01); *B26D 5/34* (2013.01); *B26D 7/0006* (2013.01); *B26D 7/08* (2013.01); *B26D 7/2614* (2013.01); *B26D 7/2628* (2013.01);
(Continued)

(58) Field of Classification Search
CPC ........ G05B 19/402; G05B 2219/49099; G05B 19/19; B26D 5/086; B26D 7/2628; B26D 7/0006; B26D 5/32; B26D 7/08; B26D 7/2614; B26D 5/34; B26D 2007/0093; B26D 5/20; B26D 5/083; B26D 2007/0278; B26D 2007/0078; B26F 1/3813
USPC ............ 83/13, 72, 76.9, 266, 373, 940, 941; 700/114
See application file for complete search history.

(56) References Cited

U.S. PATENT DOCUMENTS 3,282,140 A    11/1966 Sasabuchi et al.
3,772,949 A    11/1973 Pavone et al.
(Continued)

OTHER PUBLICATIONS

International Search Report dated May 27, 2014, relating to International Application No. PCT/US2014/017524.
(Continued)

*Primary Examiner* — Ghassem Alie
(74) *Attorney, Agent, or Firm* — Honigman LLP

(57) ABSTRACT

An electronic cutting machine includes at least one housing to which a drive roller is coupled for moving a sheet to be cut in a first direction and a cutter assembly coupled to the housing and moveable in a second direction that is perpendicular to the first direction.

15 Claims, 12 Drawing Sheets

Related U.S. Application Data

(60) Provisional application No. 61/928,952, filed on Jan. 17, 2014, provisional application No. 61/767,138, filed on Feb. 20, 2013.

(51) Int. Cl.
| | | |
|---|---|---|
| *B26D 7/26* | (2006.01) | |
| *B26D 5/32* | (2006.01) | |
| *B26D 7/00* | (2006.01) | |
| *B26D 7/08* | (2006.01) | |
| *B26F 1/38* | (2006.01) | |
| *B26D 5/08* | (2006.01) | |
| *B26D 5/34* | (2006.01) | |
| *B26D 5/20* | (2006.01) | |

(52) U.S. Cl.
CPC ............ *B26F 1/3813* (2013.01); *B26D 5/083* (2013.01); *B26D 5/20* (2013.01); *B26D 2007/0087* (2013.01); *B26D 2007/0093* (2013.01); *B26D 2007/2678* (2013.01); *G05B 2219/49099* (2013.01)

(56) References Cited

U.S. PATENT DOCUMENTS

| | | | |
|---|---|---|---|
| 4,481,800 A | 11/1984 | Ruhl | |
| 4,550,626 A | 11/1985 | Brouwer | |
| 4,695,963 A | 9/1987 | Sagisawa et al. | |
| 4,860,406 A | 8/1989 | Staheli et al. | |
| 5,575,099 A | 11/1996 | Strobel et al. | |
| 6,580,963 B2 | 6/2003 | Susnjara | |
| 6,652,061 B2 | 11/2003 | Allen et al. | |
| 7,416,473 B2 | 8/2008 | Belli et al. | |
| 8,123,094 B2 | 2/2012 | John et al. | |
| 8,156,852 B2 | 4/2012 | Shibata et al. | |
| 8,177,443 B2 | 5/2012 | Malone et al. | |
| 8,191,451 B2 * | 6/2012 | Stolyar ................ | B26D 7/2635 83/72 |
| 2002/0144578 A1 * | 10/2002 | Mikkelsen ............... | B26D 5/00 83/13 |
| 2008/0134851 A1 * | 6/2008 | Roach ..................... | B26D 5/02 83/56 |
| 2009/0000437 A1 | 1/2009 | Johnson | |
| 2009/0077818 A1 | 3/2009 | Van Wambeke et al. | |
| 2010/0050848 A1 | 3/2010 | Elhaus | |
| 2011/0232437 A1 * | 9/2011 | Johnson ............... | B26D 7/2614 83/13 |
| 2011/0259164 A1 | 10/2011 | Clark et al. | |
| 2011/0280999 A1 | 11/2011 | Crystal et al. | |
| 2012/0219344 A1 | 8/2012 | Kishi et al. | |
| 2012/0247297 A1 | 10/2012 | Kawaguchi et al. | |
| 2014/0260855 A1 | 9/2014 | Tokura et al. | |

OTHER PUBLICATIONS

International Preliminary Report on Patentability dated Aug. 25, 2015, relating to International Application No. PCT/US2014/017524.

Canadian Office Action dated Jun. 9, 2016 for Application No. 2901182.

Canadian Office Action dated Dec. 27, 2017 for Application No. 2901182.

Canadian Office Action dated Jun. 22, 2020 for Application No. 3,030,875.

Non-Final Office Action dated Sep. 28, 2017, relating to U.S. Appl. No. 14/768,405.

Final Office Action dated Apr. 23, 2018, relating to U.S. Appl. No. 14/768,405.

Non-Final Office Action dated Oct. 11, 2018, relating to U.S. Appl. No. 14/768,405.

Final Office Action dated May 3, 2019, relating to U.S. Appl. No. 14/768,405.

Non-Final Office Action dated Nov. 27, 2019, relating to U.S. Appl. No. 14/768,405.

Non-Final Office Action dated Jun. 23, 2020, relating to U.S. Appl. No. 14/768,405.

* cited by examiner

ELECTRONIC CUTTING MACHINE

CROSS REFERENCE TO PRIOR APPLICATIONS

This U.S. patent application is a continuation of, and claims priority under 35 U.S.C. § 120 from, U.S. patent application Ser. No. 14/768,405, filed on Aug. 17, 2015, which is a U.S. National Phase application under 35 U.S.C. § 371 of International Application No. PCT/US2014/017524, filed on Feb. 20, 2014, which claims priority under 35 U.S.C. § 119(e) to U.S. Provisional Application 61/928,952, filed on Jan. 17, 2014, and U.S. Provisional Application 61/767,138, filed on Feb. 20, 2013. The disclosures of these prior applications are considered part of the disclosure of this application and are hereby incorporated by reference in their entireties.

SPECIFICATION

BE IT KNOWN THAT, Jeremy B. Crystal, a citizen of the United States; Jeffery V. Gubler, a citizen of the United States; Clark L. Roper, a citizen of the United States; James T. Davis II; Jim A. Colby, a citizen of the United States; Daniel Torgerson, a citizen of the United States; Al Romig, a citizen of the United States; Steve Bandis, a citizen of the United States; Matthew Waibel, a citizen of the United States; Robert Woldberg, a citizen of the United States; Donald B. Olsen, a citizen of the United States; and Matthew L. Tuttle, a citizen of the United States, have invented a new and useful electronic cutting machine and method of using the same of which the following is a specification:

BACKGROUND

The present invention relates generally to electronic cutting machines and associated software.

SUMMARY

The invention generally relates to an electronic cutting machine which includes, as main elements, the following items: a cover portion, a roller system, a blade and tool housing portion, a user input portion and multiple storage portions.

There has thus been broadly outlined some of the features of the invention in order that the detailed description thereof may be better understood, and in order that the present contribution to the art may be better appreciated. There are additional features of the invention that will be described hereinafter.

In this respect, before explaining any embodiment of the invention in detail, the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an electronic cutting machine to be used for creating designs with various materials, such as paper, fabric, chipboard, vinyl, cardstock, etc.

Another object is to provide an electronic cutting machine that is novel, less expensive, simple, adjustable and more easily accessible to a home-user than the current large industrial machines or applications.

Another object is to provide an electronic cutting machine that allows users to quickly create cuts and projects that are detailed yet precise.

Other objects and advantages of the present invention will become obvious to the reader. It is intended that these objects and advantages be within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Implementations of the disclosure may include one or more of the following features.

DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views.

The disclosure will now be described, by way of example, with reference to the accompanying drawings, in which.

Like reference symbols in the various drawings indicate like elements.

Figure 1:
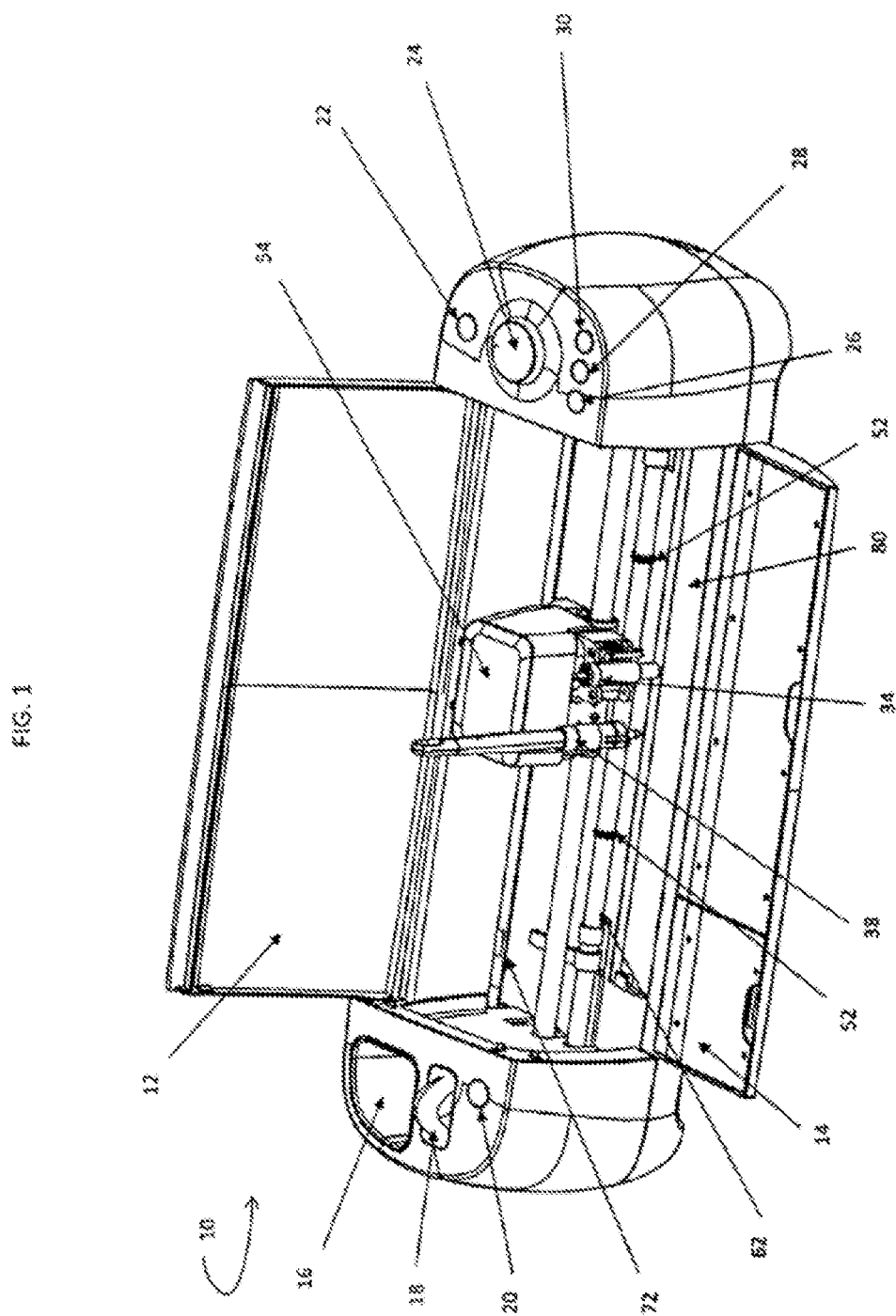
FIG. 1 is a perspective view of an exemplary crafting apparatus.
Figure 2:
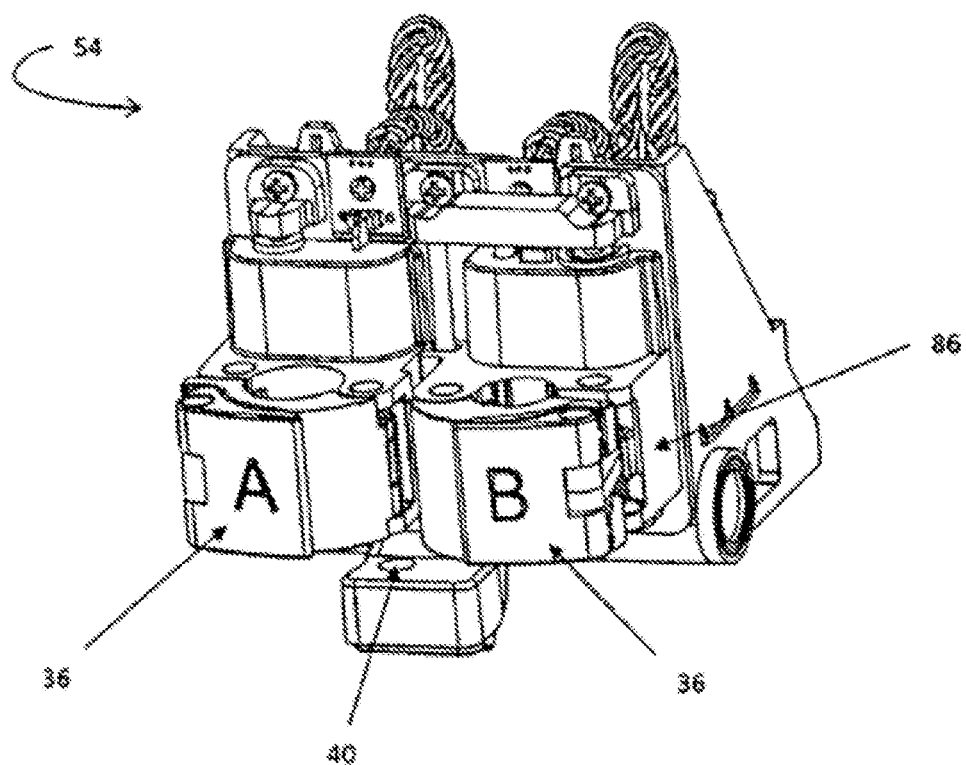
FIG. 2 is a perspective vies of an exemplary carriage.
Figure 3:
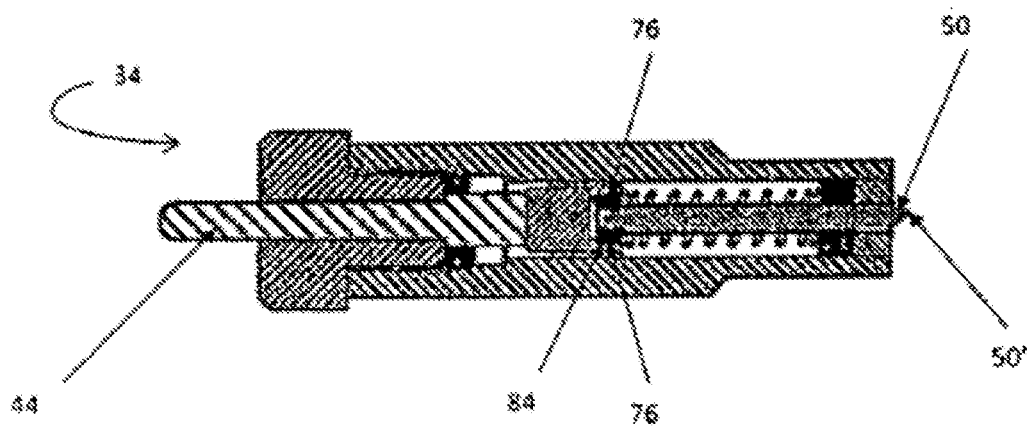
FIG. 3 is a perspective view of an exemplary blade housing.
Figure 4:
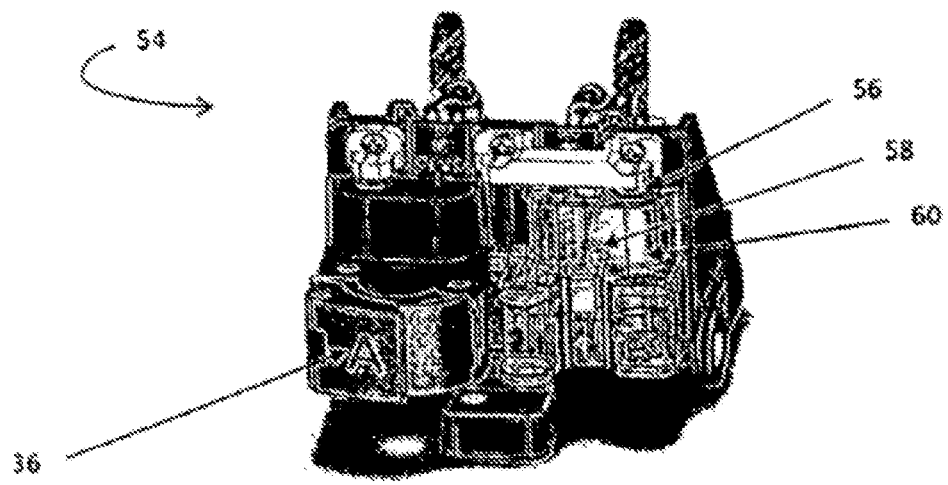
FIG. 4 is a perspective shaded view of an exemplary carriage showing an exemplary rack and pinion and slider spring.
Figure 5:
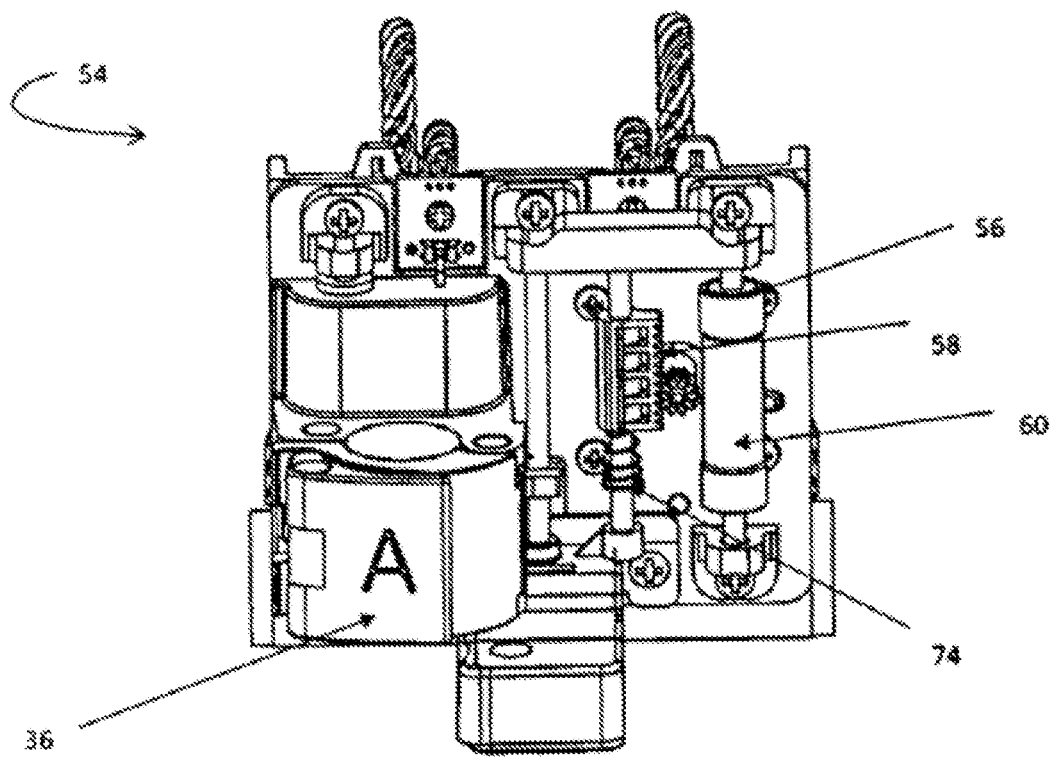
FIG. 5 is a perspective, partial, cut-away view of an exemplary carriage showing an exemplary rack and pinion and slider spring.
Figure 6:
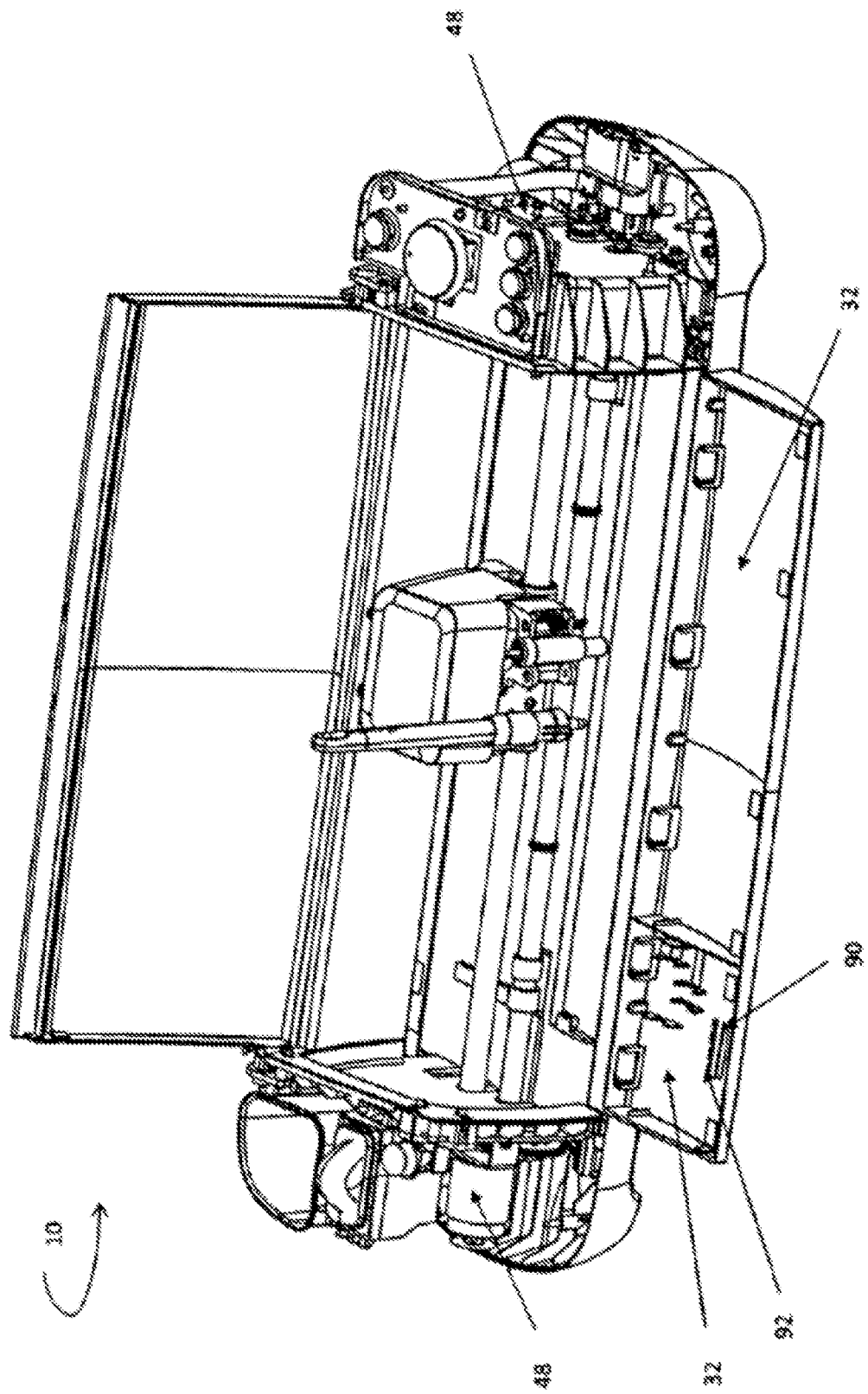
FIG. 6 is a perspective, cut-away, cross-sectional view of the crafting apparatus showing the servo motor(s) and the door storage compartment.
Figure 7:
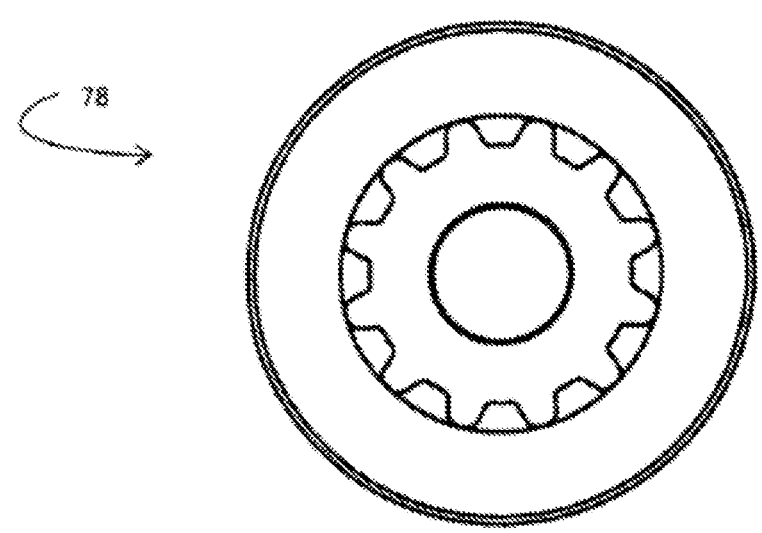
FIG. 7 is an enlarged view of a pulley.

10. Electronic Cutting Machine;
12. Top Door;
14. Bottom Door;
16. Top Storage Compartment;
18. Memory Device Port;
20. Open Button;
22. Power Button;

24. Encoder; Encoder Assembly;
26. Load Button;
28. Cut Button;
30. Pause Button;
32. Door Storage Compartment;
34. Blade Housing;
36. Housing Clamp A;
36'. Housing Clamp B;
38. Alternate Tool Housing;
40. Positional (Z) Sensor;
42. Slot Pin;
44. Solenoid Plunger;
46. Vertical Plate;
48. Servo Motor;
50. Blade;
52. Rollers;
54. Carriage; Carriage Assembly;
56. Linear Bearing;
58. Rack & Pinion;
60. Tube;
62. Carriage Shaft;
64. Custom Setting;
66. Material Setting;
68. Sample Image;
70. Output Image (e.g. cut path);
72. Anti-rotation Member;
74. Slider Spring;
76. Ball Bearing(s);
78. Pulley;
80. Machine Floor;
100. Working Tool;
102. Cutting Working Tool;
104. Marking Elements 106, 108, 110
106. Scribe Working Tool;
108. Embosser Working Tool;
110. Writing Implement Working Tool;
112. Linear Movement of 54;
114. Material (medium) to be worked on by tool 100;
116. Carrier #1 Look-up Table;
116'. Carrier #2 Look-up Table;
118. Carrier #1 Motor Controller;
119. Carrier #1 Plate;
119'. Carrier #2 Plate;
120. Carrier #1 Stepper Motor;
122. Stepper Motor Output Drive Shaft;
124. Pinion;
125. Rotational Movement of 124;
126. Rack;
127. Linear Translation of 126;
128. Rack Guide Shaft;
130. Downward Urging Spring;
132. Upward Urging Spring;
134. Sensor for Sensing "HOME" Position of 140;
134'. Sensor for Sensing "HOME" Position of 140';
136. Linear Guide Shaft;
138. Housing Body "A";
138'. Housing Body "B";
140. Housing Body Assembly "A";
140'. Housing Body Assembly "B";
142. Signal Path from Sensor 134;
142'. Signal Path from Sensor 134';
144. Linear Guide Shaft Bore Formed in 138

DETAILED DESCRIPTION

A. Overview

Throughout history, it has been known that individuals have found a sense of personal fulfillment/achievement/satisfaction/expression by creating art. In recent times, during the late 19$^{th}$ century, an art reform & social movement led by skilled tradesmen was slowly starting to be recognized by many people across America, Canada, Great Britain and Australia. This movement has often been referred to as the "Arts-and-Crafts Movement."

The so-called "Arts-and-Crafts Movement" that began many years ago has continued to evolve today by many persons that may not necessarily be skilled in a particular trade. As such, it may be said that non-skilled persons may be involved in the "arts-and-crafts" as a social activity or hobby. In some circumstances, the activity or hobby may be practiced for any number of reasons ranging from, for example: economic gain, gifting, or simply to pass time while finding a sense of personal fulfillment/achievement/satisfaction/expression.

With advances in modern technology, the "Arts-and-Crafts Movement" that began many years ago is nevertheless susceptible to further advancements that may enhance or improve, for example, the way a skilled or non-skilled person may contribute to the arts-and-crafts. Therefore, a need exists for the development of improved components, devices and the like that advance the art.

Electronic cutting machines have been developed to assist crafters from the fanatical and experienced crafter to the novice crafter in exploring their creativity. These users have a need to cut a wider range of materials, cut more easily and cut more precisely.

B. Electronic Cutting Machine

Some of the major concerns for existing electronic cutting machines are precision cutting, simplicity, storage, cut settings for various materials, and manufacturing tolerances and checks for consistency. The invention described, addresses these problems.

The preferred embodiment of the invention contains an 24 encoder, a dial or a material dial, which allows the user to easily select the type of material they wish to cut. In the past, do-it-yourself (DIY) crafters have been required to know and remember the optimal settings to cut out the plethora of materials that can be cut by electronic cutting machines and have been further intimidated by projects that require cutting more than one type of material. Materials vary widely in thickness and texture and switching materials requires adjustments to the speed, pressure, and depth of the blade. Most common materials, include paper, vinyl, iron-on, cardstock, fabric and poster board, all of varying weights and sizes. In the past, changing materials forced users to adjust the blade settings of speed, pressure and depth manually—a tedious and imprecise task.

The present invention stores the optimal ranges for each of the material settings, in for example units of force, or pounds. The 66 material settings were achieved by measuring the amount of force necessary to cut through a given material and the high end of too much force for the same material. Optimal line force settings for the 10 electronic cutting machine or associated software are for paper 45-65 grams of force; vinyl 50-70 grams; iron-on material 90-110 grams; light card stock 180-205 grams; cardstock 235-265 grams; fabric 260-350 grams; fabric multi-cut materials 250-335 grams; poster board 280-320 grams; poster board multi-cut 275-370 grams.

The present invention contains the optimal speed ranges, pressure ranges and multi-cut numbers for materials to be cut by the electronic cutting machine.

In an alternate embodiment, the invention contains only one of the cut factors (speed, pressure or multi-cut). For instance, the invention could contain an 24 encoder for pressure, while the speed and multi-cut remain constant for each cut and each material.

In an alternate embodiment, the settings associated with each material, could instead or in conjunction be determined by the user or by the 10 electronic cutting machine depending on the intricacy of the pieces to be cut.

In an alternate embodiment the 24 encoder is an incremental dial with set positions.

In an alternate embodiment the 24 encoder is a material dial.

In an alternate embodiment the material dial is a sixteen (16) position encoder.

In an alternate embodiment the 24 encoder would contain an analog dial that does not have set positions for specific materials.

In an alternate embodiment the 24 encoder is a potentiometer dial with digital or analog set points.

The new encoder (or material dial) eliminates the manual blade adjustments and alleviates the hassles of remembering optimal material settings and of cutting different materials in general. The user turns the 24 encoder to the appropriate 66 material setting and presses the 28 cut button and the 10 electronic cutting machine applies the optimal blade settings for that material.

If the user wishes to cut a material that is not preprogrammed on the machine or associated software, an embodiment of the electronic cutting device has a 64 'Custom' setting for the user to choose from a preset materials list on the 10 electronic cutting machine or associated software or both, and save settings based on their personal preferences.

In an alternate embodiment, the operator of the machine may modify the preprogrammed settings for a given material through the machine or associated software.

At the factory level, each machine is calibrated by measuring force at the blade contact point required to cut a specific material and then the required force is compared that to the number of motor steps to reach that force. The number of motor steps, force, or both are stored by the machine in a manner that corresponds with the specific material. If the force is not appropriate, then user may increase or decrease the motor steps, force or both in the material settings on the machine or through the associated software.

In an alternate embodiment, to calibrate each material setting half-steps are measured to reach the required force to cut a given material. This method reduces the variation that is due to springs and tolerance.

The present invention eliminates blade depth adjustment by the user.

The present invention implements motor driven blade engagement and pressure control including vertical actuation for controlling depth and pressure of blade for more precise cutting.

The present invention utilizes z-actuation with a 48 servo motor.

An alternate embodiment of the personal electronic cutter implements a 56 linear bearing to provide a very low friction environment.

An alternate embodiment the 56 linear bearings are in a 60 tube (e.g. steel tube) to provide for better alignment. The 60 tube may then be bolted into a plastic part.

An alternate embodiment contains a split bushing in place of the 60 steel tube with the 56 linear bearing(s). The split bushing performs the same function as a sleeve, but allows the bearings to be placed without press fit force (or excessive force to press fit). The tube may then be placed inside the machine plastics securely despite variances in the plastics.

The invention described incorporates a software algorithm that remembers the 50 blade orientation from the previous cut so that the 50 blade can be pre-aligned prior to beginning the desired cut. The direction of the 50 blade is stored by the 10 electronic cutting machine or associated software so that it may be moved into the optimal position before or as it is being lowered into cutting position. The tool (e.g. 10 blade) is pre-aligned and then remember where the orientation and then start the next cut or print in an orientation that is closest to the current alignment. This pre-alignment ensures the cleanest start of cut and end to cut and that there will not be any, or as much, undesired material left on the resulting cut material. Once aligned, the appropriate force may be applied to the 34 blade housing ensuring that that when the 50 blade first comes into contact with the material to be cut the 50 blade is aligned correctly to follow the desired cut path.

In an alternative embodiment, at the beginning of the desired cut, a low force is applied to the 34 blade housing. As the cut continues the force placed on the 34 blade housing is increased so that the force required to cut through the material is not applied until it is more certain that the 50 blade is aligned correctly to follow the desired cut path.

In alternative embodiments the force applied to the 34 blade housing is gradually changed (increased/decreased) or is immediately set to the optimal amount of force once the 50 blade is properly aligned.

The preferred embodiment of the invention contains soft pressure orientation where the 34 blade housing or 38 alternate tool housing descend with low pressure to allow the 50 blade to swivel into position before increased pressure is applied and cutting begins. The actuation for this soft pressure orientation may be performed by a stepper motor or a servo motor in the z-axis.

Cutting machines are required to precisely cut a wide variety of different shapes, sizes and materials. At the core of the new architecture is an intelligent hybrid motor system that dramatically improves blade control and cutting precision.

While most current commercial electronic cutting machines use stepper motors, the preferred embodiment of the instant electronic cutting machine uses a 48 servo motor. The 48 servo motor allows the electronic cutting machine to operate more quietly and allows more control and precision of the cutting. The 48 servo motor allows feedback control to better enable the machine to recognize the tool's (e.g. 50 blade's) exact location. Other advantages of the 48 servo motor include, they are less expensive, operate more quietly, and are more efficient (use less power).

Each 10 electronic cutting machine may be calibrated on the manufacturing line to ensure the materials settings are precise, the draw and cut lines are aligned, and the cuts are accurate. Once the 10 electronic cutting machines are produced, random samples are pulled for extensive materials and cut testing.

Even with the greatest attention to detail, there are variances in each machine rolling off the production line. To further enhance the preciseness of cutting, printing, drawing, scoring, etc., the 10 electronic cutting machine incorporates a software algorithm that will allow the factory personnel or the end user to calibrate the machine to ensure alignment between the 34 blade housing and the 38 alternate tool housing. Not only will this algorithm allow the factory to calibrate the 10 electronic cutting machine prior to being shipped, it will also allow users to recalibrate the 10 electronic cutting machine if they notice variances or inaccuracies in the cutting, drawing, embossing, or scoring of the 10 electronic cutting machine.

The first step of the preferred method of calibrating the 34 blade housing and the 38 alternate tool housing is by performing the operation designed by one of the housings, more than one time on a material, in variable offsets. After the first step is completed the material would be placed so that the 10 electronic cutting machine could perform the operation of the other housing more than one time on the material, in variable offsets. The resulting marks are indexed and marked with an identifier, such as a number, letter or other symbol. The operator then reviews the at least four results or marks on the material and selects which of the pairs of marks align exactly or most closely.

The preferred embodiment of the invention contains a 40 position (z) sensor that may be aligned with a 50 blade or 34 blade housing or 38 alternate tool housing. The sensor checks alignment with the 50 blade by referring to at least two corresponding fiducial marks.

The method described includes determining a number of steps to move the 50 blade or 54 carriage a first distance in a first direction, determining a number of steps to move the 50 blade or 54 carriage a second distance in a second direction orthogonal to the first direction, creating (drawing, scoring, etc.) calibration images with the alternate tool, and cutting the calibration images with the 50 blade. Each calibration image is cut with a cutter offset different from the other calibration images. The method includes selecting a cut calibration image and using the cutter offset of the selected calibration image for cutting operations. In some implementations, the method includes locating first and second marks spaced from each other along the first direction on a mat received by the 10 electronic cutting machine and then determining a number of steps to move the cutter along the first direction between the first and second marks. The method may also include locating third and fourth marks spaced from each other along the second direction on the mat and then determining a number of steps to move the cutter along the second direction between the third and fourth marks. In some examples, calibration images comprise at least one of horizontal lines and vertical lines.

In an alternative embodiment of the invention, there are only two marks made, one by one housing and one by the other housing. With this alternative embodiment, the operator chooses whether the marks are aligned or not.

In a preferred embodiment, the 10 electronic cutting machine may perform actions that allow the operator to determine how much backlash the machine has. In one embodiment, the 10 electronic cutting machine will operate so the blade cuts through a stair like sequence of vertical and horizontal cut paths going in one direction across the cut medium (first series of cuts), then bring the 50 blade across the cut medium in the opposite direction (second series of cuts) so that they mirror the first series of cuts. The user then measures the middle of the line to ensure highest degree of accuracy and to account for the 50 blade to swivel into place.

In a preferred method the second series of cuts is far enough from the first series of cuts to ensure the 50 blade does not slide into a trough created by the first cut. To help ensure that the 50 blade does not fall into a trough and to make it easier for a user to determine the amount of backlash, the backlash is multiplied by a factor, for example by 10× or 100×.

In alternative embodiments, on the manufacturing line, or at the end user level, the operator of the 10 electronic cutting machine may cut a matrix or array of small circles (e.g. 5 mm) with different levels of backlash applied in a graded fashion for each column and row corresponding to X- and Y-axis backlash. For instance in one direction (e.g. across the material) the X-axis varies and in the other direction (e.g. down) the y-axis varies. By the operator inspecting and selecting the best circle either manually or with an automated optical measurement machine then determines the appropriate backlash to be applied by the machine, firmware or associated software to ensure the best cut accuracy. Each machine may be calibrated on the production line to reduce or eliminate sources of machine to machine variation.

In an alternate embodiment, the machine may cut out one or more circles and then allow the user to manipulate the circle(s) with the machine or software in order to instruct the machine how to correct for any backlash.

In an alternate embodiment, the x- and y-coordinates would vary one at a time. For instance the user would test all of the x-axis variants and select the best one and then test all of the y-axis variants and select the best one.

In an alternate embodiment print paths from an ink cartridge, writing utensil, pen or an embossing path is created and tested.

In alternative embodiments, this "backlash algorithm" can be performed at a factory/manufacturing level or at the end-user level.

The preferred embodiment of the current invention contains a new 78 pulley with a gentle radius at the top of the 78 pulley tooth to push the belt further in advance so that it more likely to be in the correct spot when the next tooth comes into contact with the belt and it provides an easier run in for the cog of the belt. The larger radius on the belt lead in to avoid "catching" the belt tooth on the pulley tooth. This invention allows the electronic cutting machine to run with a smaller pulley diameter than recommended. If further reduces wear and tear on belt and the vibration in the system.

A brand-new 34 blade housing takes advantage of the new 50 blade tip with a sophisticated springloaded, dual 76 ball bearing design that allows the 50 blade to spin freely, enabling the most intricate of cuts.

The upper standard 76 ball bearing assembly is used to capture the cone of the end of the 50 blade instead of having loose ball bearings ride on the end of the 34 blade housing. This invention allows for smoother spinning of the 50 blade and is less susceptible to debris interfering in the spinning of the 50 blade, as is the case with current electronic cutters.

The carriage or apparatus containing or holding the 34 blade housing is spring loaded to allow the 50 blade to ride along paper with imperfections. Preexisting machines use brass or bronze bushings and when a side load is added the 50 blade does not float easy enough for precise cutting on uneven surfaces. The present invention includes a 58 rack gear which floats up and down. Further the 56 linear bearings are made to go in a single linear direction.

The current invention contains a slider assembly with a 74 non-linear spring or two springs used in series (an upper and a lower spring). The lower spring still acts as a spacer. The upper spring, preferably a very soft spring, allows the machine to have a wider half step range on materials. This invention is especially important on materials with a narrow range of displacement, for example vinyl. The half steps allow for a wider range of displacement for the same force range which helps the machine cut thin materials such as basic printer paper (e.g. 20-30 lb).

An alternative embodiment of the invention, one or both of the springs is a variable rate spring. This allows for lower force on the low end and then stiffness of the spring increases as it is deflected more.

The 76 ball bearings are used unconventionally to allow the 50 blade to seat on the inner race of the 76 ball bearing which in turn allows the 50 blade to spin more freely within the 34 blade housing, leading to less friction and more precise cutting.

In the present invention there is just a conical contact between the 50 blade and 76 ball bearing which allows the 50 blade to turn freely and also helps avoid the problem of many electronic cutters where paper or dust gets caught in the blade housing and lessens cut preciseness.

In an alternate embodiment, the upper bearing is 1.5 mm ID and the lower bearing is 2 mm ID.

The cut assembly adds precision with a unique dual-axis configuration combining the best features of both stepper and servo motors. A motor (high-torque stepper motor) drives a gear (58 rack and pinion gear) that compresses a spring, allowing highly granular control over the blade assembly, for instance, adjusting the pressure as needed based on the user selected material setting. 56 Linear bearings housed in the 60 tube (e.g. metal tube) ensure precise alignment of the 56 linear bearings and dramatically reduce friction, creating a smooth and consistent cut depth. The result is an unprecedented level of control over 50 blade depth and pressure across the entire cutting path. When a cut starts, the assembly reads the cut path and then adjusts the speed to accurately cut the close corners—realtime adjustments that limit deviance from the cutting path.

An alternate embodiment of the invention contains software/firmware that automatically adjusts cutting speed so every cut is smooth from start to end. This is especially crucial as the 50 blade travels around tight corners or in and out of tight angles.

The preferred embodiment of the invention contains cam actuated 36 housing clamps making the clamps easier to open to access the 34 blade housing or 38 alternate tool housing. This invention also allows the user to simply drop in the 50 blade or alternate tool and still ensure the height of the 50 blade or tool is correct.

In an alternate embodiment the cam actuated 36 blade housing clamp(s) is spring loaded so that the clamp opens more fully when the cam is open.

In an alternate embodiment, the 34 blade housing (or holder), or 38 alternate tool housing (or holder) or both contains or a collet style accessory clamp or finger like features to ensure that when the blade or tool are dropped in, they are at the right insertion depth and that the 50 blade or alternate tool is secure during operation.

In an alternate embodiment the 34 blade housing, or 38 alternate tool housing or both contain a bladder like device that may be expanded or contracted to further secure the 50 blade or tool into the housing to ensure for more precision in performance (e.g. cutting, printing, drawing, scoring, etc.).

To ensure that the 80 machine floor is flat, the floor is measured at factory level. In existing machines the 80 machine floor is held with screws. In the current invention the 80 machine floor is held down with speed nuts.

In an alternate embodiment the 80 machine floor flatness is measured with a load cell. The flatness is dynamically measured so that the 50 blade or tool is raised or dropped the appropriate across a given path (e.g. cut path), so that as the 50 blade or tool moves across the path it is moved up or down based on variations in the floor. This helps ensure an optimal amount of pressure is applied all the way across the mat.

In an alternate embodiment the 80 machine floor flatness may be measured with an optical measurement system or a touch probe. With digital feedback built right into the machine, the calibrated 80 machine floor flatness may be used to determine how to adjust the 50 blade depth or pressure on the fly.

In an alternate embodiment the 80 machine floor flatness is enhanced by a placing a silicon washer under the push nut or speed nut to ensure that when the 80 machine floor is manufactured the 80 machine floor is flush and when the 80 machine floor is pushed into place the nut gives you enough over travel with the material (e.g. silicone) the nut expands and then washer takes up the over travel rather than having the floor spring back or lift a little. Without the washer you would get push in the floor and may have dimples where screw is placed into.

An alternate embodiment of the 10 electronic cutting machine contains a screw backstop for belt tension. A screw is added to the belt tension bracket to ensure the spring from compressing for ease of installation and maintaining belt tension. The problem being addressed is that in existing machines, when the spring gets compressed the belt becomes loose. In the present invention the spring is braced so that it cannot compress as much, or at all, and the screw acts as a stop.

An alternate embodiment of the invention contains an 72 anti-rotation member to keep the 54 carriage for the 50 blade and/or tool housings from tilting back and forth. Invention contains a plastic rail that presses against the bottom of the 72 anti-rotation rail with an opposing spring loaded button which presses on the top rail such that the 54 carriage is held between the top and bottom rail. This works to eliminate all front to back rotational slop in the carriage system.

An alternate embodiment of the invention contains a 52 roller, rubber cone or ring to be placed on the 62 shaft that would be flexible yet still hold down the material to be cut and maintain constant pressure on the cutting material.

In an alternate embodiment the 52 roller, rubber cone or ring would be made of stiff rubber (e.g. 70-80 durometer).

In an alternate embodiment multiple (e.g. 3-4) 52 rollers, rubber cones or rings would be placed on each roller or shaft.

In an alternate embodiment of the invention, multi-layered fonts are created and utilized. So that each font consists of multiple layers that when placed together (on top of each other) give dimension to the font, image or other artwork.

Exploiting the feedback capabilities of the 48 servo motors, the device firmware adjusts 50 blade speed to ensure the most precise cut possible. The new software ensures more perfect cuts by anticipating changes in the cutting path and controlling the speed around sharp corners—thereby eliminating tears and jagged edges. The firmware also keeps track of 50 blade orientation as the assembly moves from one image to another on a sheet of material. The tip of the 50 blade is cast in a finely-grained metal which better resists wear and breakage, greatly extending the expected lifespan of the 50 blade.

In an alternate embodiment of the invention the 50 blade tip is cast in specially formulated tungsten carbide.

The present invention included a change in the 50 blade geometry that improves accuracy and optimizes cuts across a wider range of materials. The new geometry extends the life span of the 50 blade tip even further, providing users with a noticeable increase in cutting distance. The new 50 blade design also makes it easier for the 50 blade to navigate sharp corners, adding more precision and speed.

An alternate embodiment of the invention contains a torsion tie rod on either or both of the doors (12 top door or 14 bottom door) to ensure that the door remains in proper alignment to improve alignment of the plastics and aesthetics when the door is closed (so the door is flush with surrounding machine pieces) and to improve overall rigidity.

With the design software users may upload files containing images to the Cut What You Want® tool to convert their own design into a cuttable image in a few clicks. There are other programs available that convert normal image files (e.g. .jpg, .png, .svg) into "cut-path" instructions for an electronic cutting machine. The novelty of the present invention is the ease at which the users may accomplish this. Other software requires the user to jump through many hoops before achieving the results.

Users of the present invention will only be required to complete three easy steps before being able to accurately and precisely cutting their uploaded image.

The present invention also allows users to purchase subscriptions to the content library (e.g. month-by-month or annual) to receive unlimited access to the thousands of images contained in the content library.

Further, users are allowed to try the images by placing it on the worksheet, available in the software, before electing to purchase the images. This allows the users to play around with the images before making the purchase. Users are only required to purchase the images the elect to cut with the electronic cutting device.

An alternative embodiment of the 10 electronic cutting machine and associated software allows users to perform actions (cut, print, draw, score) on both sides of the paper.

An alternate embodiment of the 10 electronic cutting machine determines the location to perform the desired action by cutting a design (e.g. a slit, square, or diamond) before, while, or after performing the desired action on side one of the cutting material and then finding the design after the cutting material has been flipped to the opposite side.

An alternate embodiment of the 10 electronic cutting machine contains a cutting mat with the marks to represent the most common sizes of paper, cards or other material or projects to be created (e.g. 3"×5", 4"×6", 8.5"×11"). The user would place the cutting material within the borders or marks and then perform the desired action(s) (e.g. cut, print, draw, and/or score) on the first side of the cutting material and then flip the cutting material to the opposite side and place it again within the same borders or marks and then perform the desired action(s) on the second side of the cutting material.

Figure 11A:
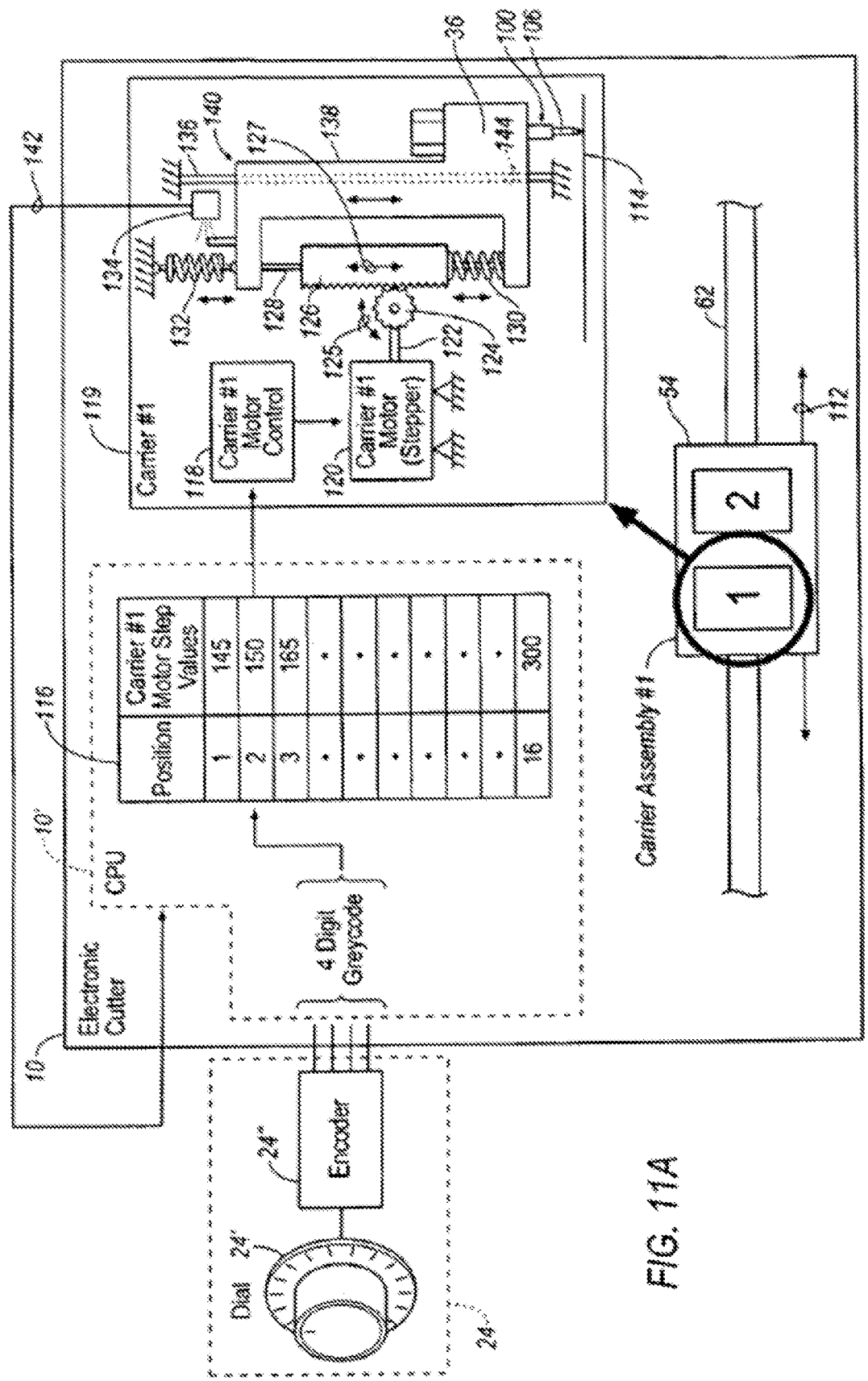
FIGS. 11A and 11B are schematic representations of an embodiment of an electrical and mechanical system that may be used and control one or more working tools.
Figure 11B:
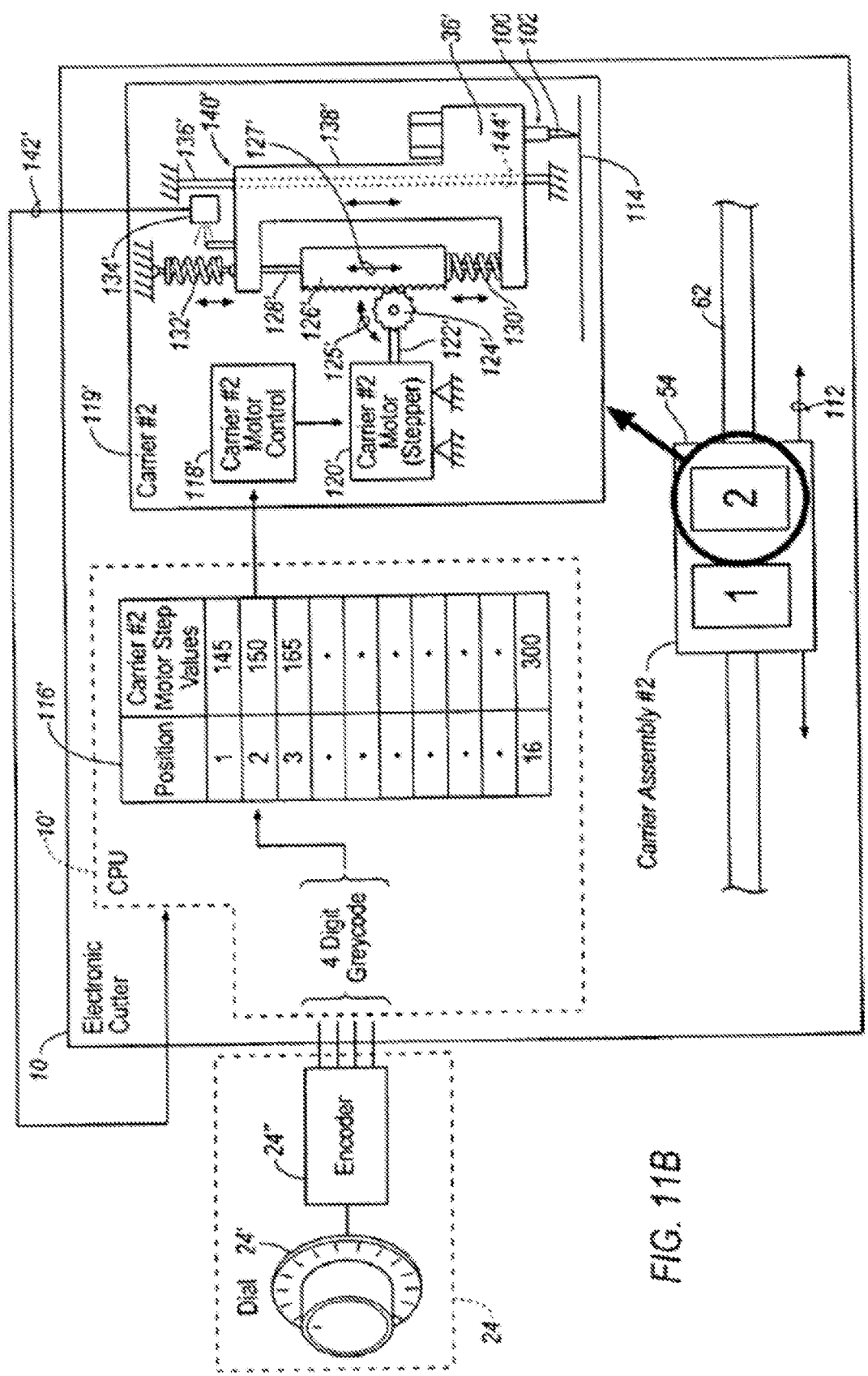

Now referring to FIGS. 11A and 11B, in an embodiment, electronic cutting machine 10 may include CPU 10' to control one or more working tools 100. For example, FIG. 11A shows CPU 10' coupled to carrier assembly 1 which is coupled to working tool 100 (scribe 106). Likewise, FIG. 11B shows CPU 10' coupled to carrier assembly 2 which is in turn coupled to working tool 100 (cutter 102). Both carrier assembly 1 and carrier assembly 2 may be affixed to a common carriage platform (not shown) which is part of a carriage assembly 54 which is freely movable 112 along carriage shaft 62 (drive mechanism for moving carriage assembly 54 along carriage shaft 62 is not shown).

The system of FIG. 11A and FIG. 11B is effective for moving its respectively associated working tool 100 away from the material (or medium) 114 to be worked and also effective for urging the working tool 100 against the material 114 to be worked. Although carriage assembly 54 is depicted carrying two carrier assemblies (carrier assembly 1 carries working tool 100 which, for example, is shown to be scribe 106 and carrier assembly 2 is shown carrying working tool 100 which is shown to be cutter 102), any number of one or more carrier assemblies can be carried by carriage assembly 54 and nothing herein should be understood to preclude that carriage assembly 54 is limited to carrying only two carrier assemblies.

Figure 8:
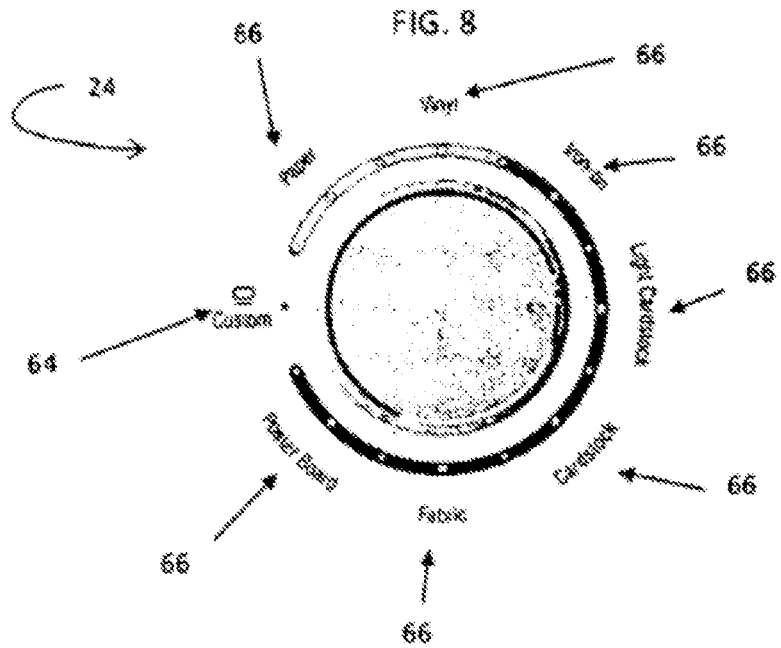
FIG. 8 is a view of an exemplary encoder showing exemplary material setting options and a custom setting option.
Figure 9:
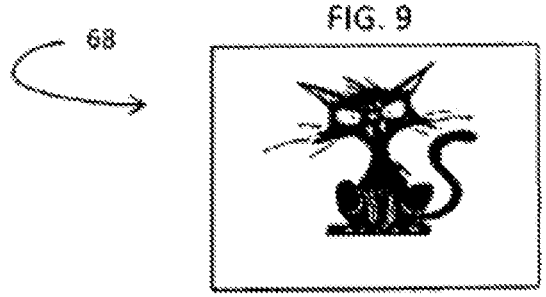
FIG. 9 is a view of an exemplary image (e.g. .jpg, .bmp, .svg) to be inputted into the present invention.
Figure 10:
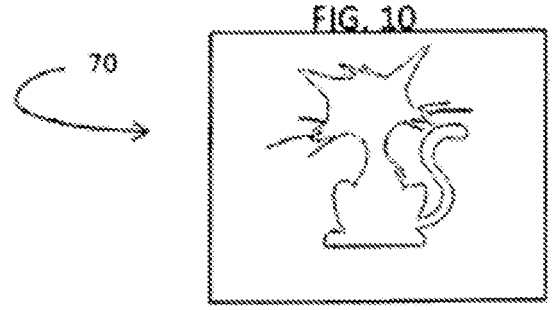
FIG. 10 is a view of an exemplary image to be outputted by the present invention.

Now referring to FIG. 11A encoder assembly 24 may include encoder dial 24' which is coupled to encoder switch 24". Encoder dial 24' is capable of numerous settings each of which can be uniquely interpreted by encoder switch 24" and encoded electrically into electrical signals that are read by CPU 10'. These electrical signals may be input directly into the input channels of CPU 10' or they may be encoded into any number of formats including digital encoding formats such as binary, gray coding, BCD or the like. In an embodiment, encoder dial 24' is a rotary dial and encoder switch 24" is an analog encoder which takes the continuous, analog rotary position of encoder dial 24' and converts it to a digital output code. Rotary dial or the housing of electronic cutter 10 may carry indicia reflective of the type of material 114 to be worked (see FIG. 8). In an alternative embodiment encoder dial 24' is rotatable in predetermined steps (i.e., defined increments) and encoder switch 24' decodes each of the distinct steps into a unique digital code which, could be, a four-digit gray code. The four-digit gray code is accepted by CPU 10' and may be fed into a lookup table 116 stored in the memory of CPU 10'. The digital code fed into CPU 10' is mapped to a position value (which correlates to the position of encoder dial 24') in table 116 and, in turn, the mapped position value is respectively associated to a carrier #1 motor step value. The use of various working tools 102-110 may each benefit from having their own respective look-up table/motor step values. Information regarding the type of working tool 102-110 residing in housing clamp 36, 36' may be manually entered by a user or may be read by appropriate sensing devices (not shown) mounted to the housing clamp 36, 36'. The carrier #1 motor step values represent the number of steps that must be sent to carrier step motor 1 in order to achieve the predetermined downward pressure exerted on working tool 100 as a function of the setting of encoder dial 24'. The motor step values residing in lookup table 116 can be interpreted any number of ways. For example, the most straightforward way to interpret the motor step values stored in lookup table 116 are to interpret them as the number of integer step signals that must be sent to carrier step motor 1. For example, if the encoder dial 24' is set to the first position and the lookup table correlates position 1 with 145 motor step values, then 145 step pulses will be sent to carrier #1 stepper motor. Although this is the most straightforward scheme for interpreting carrier #1 motor step values, any other number of schemes are anticipated such as translating linear functions of carrier #1 motor step values to motor step values as well as to fractional values. For example, if a carrier motor step value is set equal to 50, CPU 10' could use any number of well-known function, such as a linear function (i.e., offset and multiplier), to translate the carrier #1 motor step value into the number of step pulses to actually be sent to carrier stepper motor 1. Likewise, the carrier #1 motor step values can represent a fractional step pulse to be sent to carrier stepper motor 1. For example, it is well known that some stepper motors can operate at half steps or other fractional steps per pulse. The carrier #1 motor step values could represent a half step value or the like. For example, if a motor step value was set equal to 29, CPU 10' could be programmed to interpret 29 motor step values as 29 half step signals that must be transmitted to motor carrier stepper motor 1. Once CPU 10' has completed translating carrier #1 motor step values into motor step signals, the signals are sent to carrier #1 motor control 118 which in turn are amplified and sent to carrier #1 stepper motor 120.

In an embodiment, carrier #1 stepper motor includes a rotatable motor drive shaft 122 which is coupled to a pinion gear 124. Pinion gear 124 is coupled to a rack gear 126. When pinion gear 124 rotates (rotary motion 125), rack gear 126 in turn, translates the rotary motion 125 into linear motion 127. When rack 127 is placed in its upward most position (i.e., furthest away from material 114), downward urging member (spring 130) is not compressed and upward urging spring 132 is fully retracted. This is the default (i.e., "HOME") position for housing body assembly "A" 140. In this default position, housing body assembly "A" 140 is at its highest most position and working tool 100, scribe 106, is retracted away from (and does not touch) the material to be marked 114. Thus, sensor 134 provides at least an indirect way to sense the highest-most, absolute position of working tool 100.

The fully retracted position (as just described) is also known as the "HOME" position and this position can be positively sensed by sensor 134. Sensor 134 can include any number of sensor technologies such as read switches, optical sensor switches magnetic proximity sensors, or the like. When the "HOME" position is sensed by sensor 134, an appropriate digital signal is communicated back to CPU 10' along signal path 142.

Housing body "A" 138 is formed having a linear guide shaft bore therethrough 144. One or both of the ends of housing body guide shaft 136 can be anchored to carrier #1 plate 119 and the outside diameter of housing body guide shaft 136 is slightly smaller than the liner guide shaft bore 144 such that housing body "A" 138 can freely reciprocate along housing body guide shaft 136 without any significant frictional interaction. Linear guide shaft bore 144 may be fitted with linear rolling bearings, plastic sleeves and other low frictional material (not shown) to enhance the low friction interface of housing body "A" 138 and housing body guide shaft 136.

Carrier assembly #2 functions identically to that of carrier assembly #1.

Figure 12:
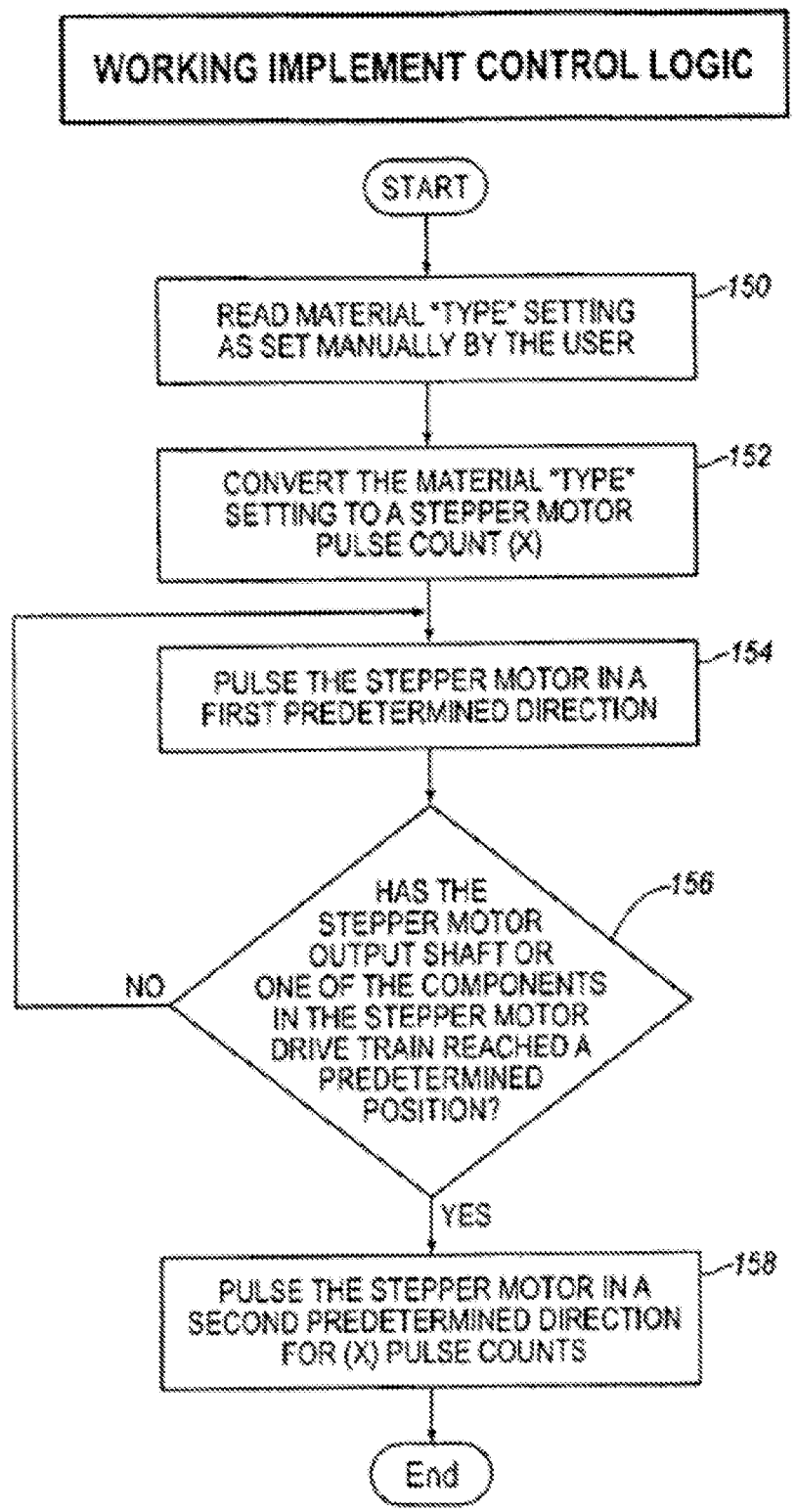
FIG. 12 is an embodiment of the control logic that may be implemented to effect control of one or more working tools.
Figure 13:
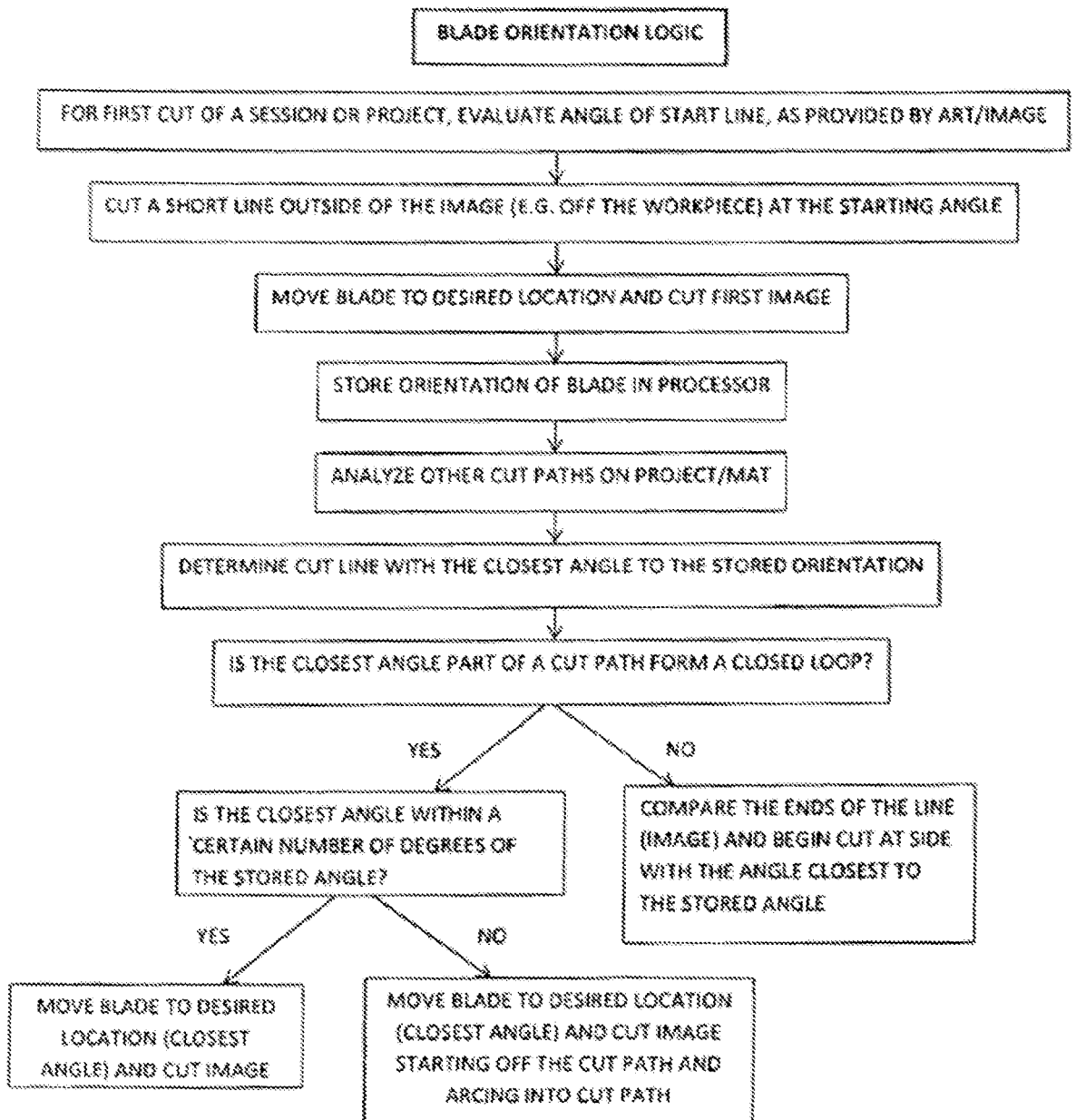
FIG. 13 is an embodiment of the blade orientation logic that may be implemented.
Figure 14:
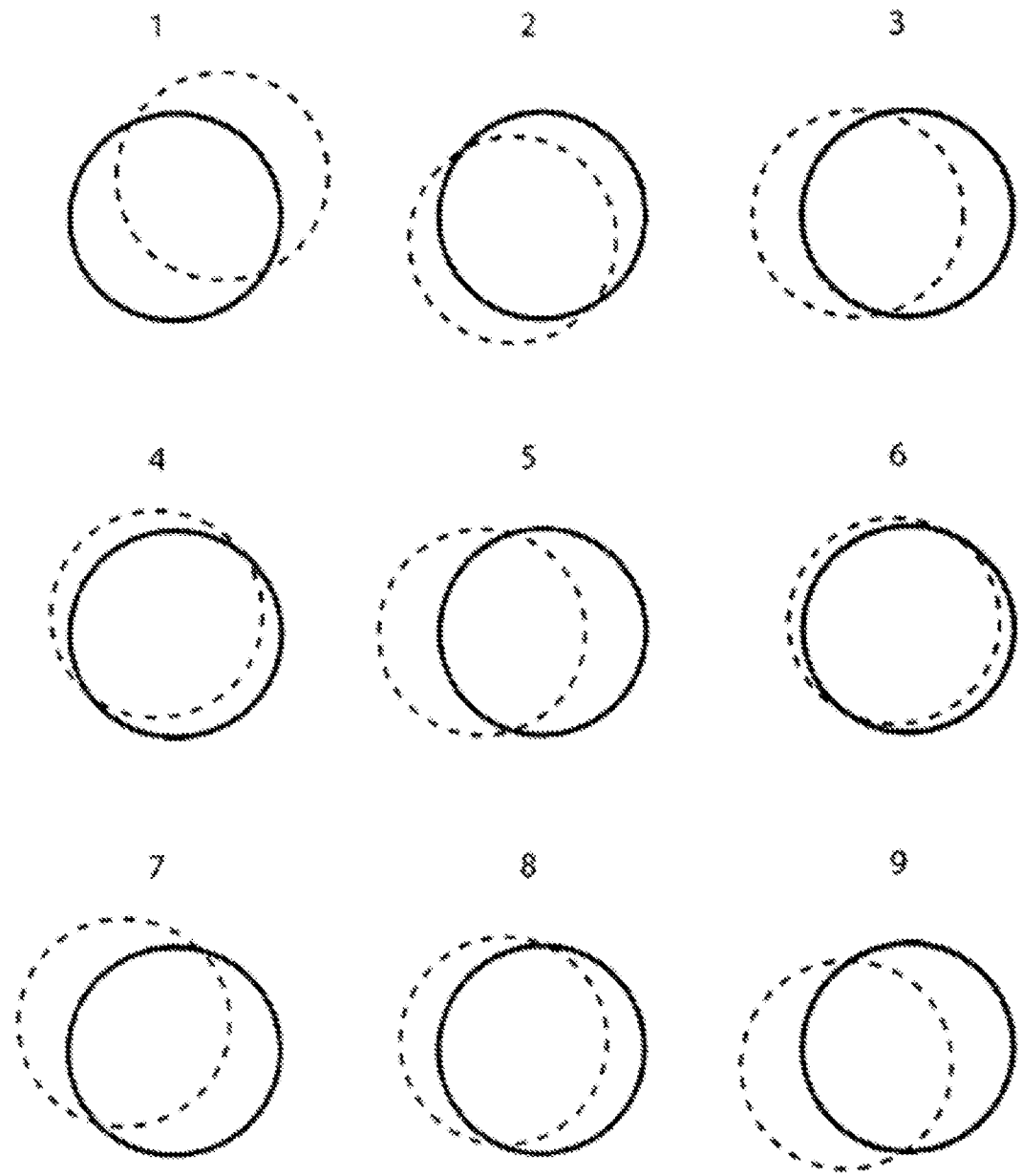
FIG. 14 is a view of an exemplary image of the results of the calibration of the present invention.
Figure 15:
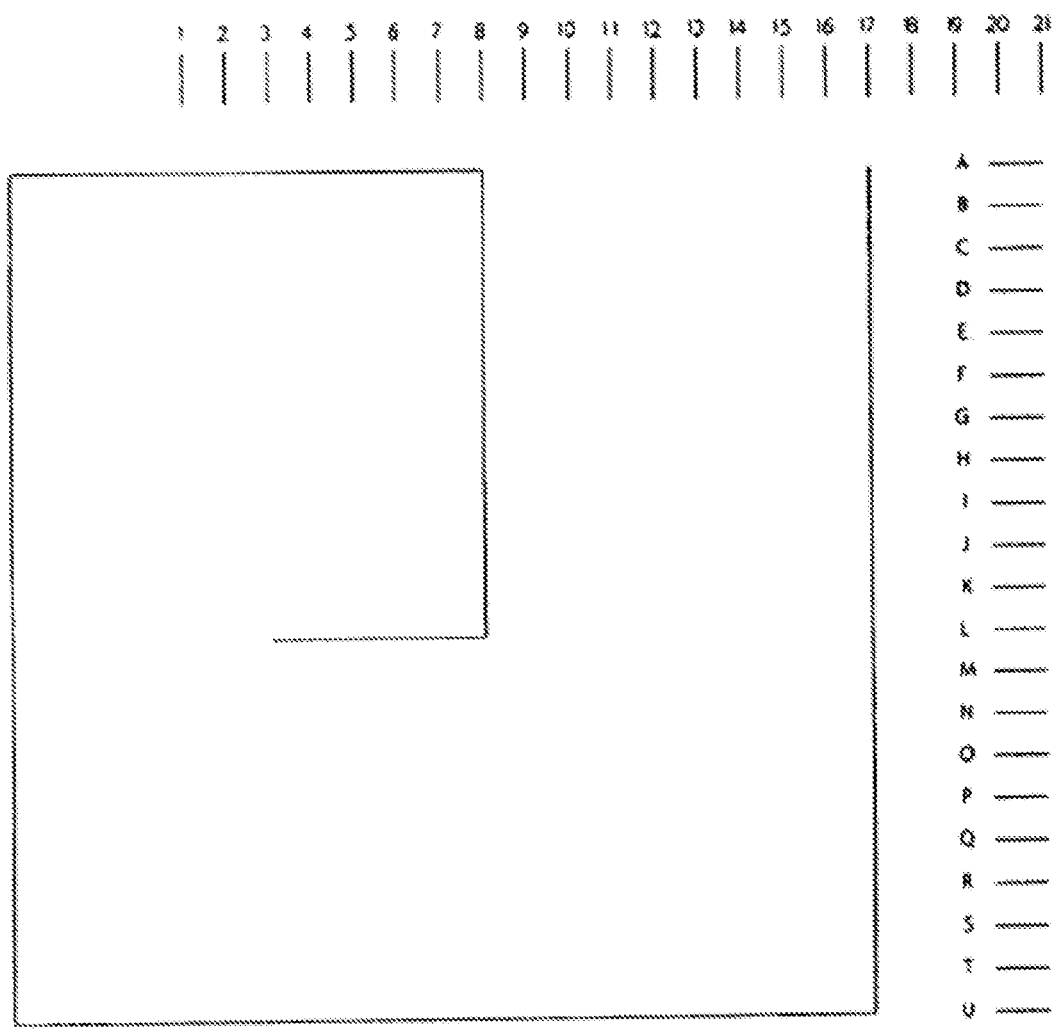
FIG. 15 is a view of an alternative image of the results of the calibration of the present invention.

Now referring to FIGS. 11A, 11B, and 12, the movement of working tool 100 to an engaged position, can be accomplished as follows. CPU 10' reads the output of encoder switch 24" 150 and used look-up table 116 to determine the number (x) of step values to use 152. Next, CPU 10' commands carrier #1 stepper motor to rotate in a first direction until the HOME position is sensed 154, 156. Next, CPU 10' sends the appropriate type of signals to the stepper motor 120 such that the stepper motor 120 reverses its direction and CPU 10' also sends the correct number of pulses (x) 158 to the stepper motor. With the advent of the signals being sent to carrier stepper motor 1, pinion 124 rotates engaging rack 126. As rack 126 begins its downward ascent, downward urging spring 130 begins to be compressed and reacts against housing body "A" 138 such that it begins to press downwardly on housing body "A" 138. This downward urging moves housing body "A" 138 downwardly along rack guide shaft 128 until working tool 100 contacts material to be worked 114. At the point where material to be worked 114 is contacted by working tool 100, any further downward movement of rack 127 will not give rise to further downward movement of housing body "A" 138, it merely will further compress downward urging spring 130 thereby creating a greater downward urging force on tool 100. Once the appropriate number of step signals have been sent to carrier stepper motor 1, pinion 124 stops rotating and rack 127 is maintained in its downward position by the inherent holding power of carrier #1 stepper motor 120. When working tool 100 is placed in its engaged position, other controls which are coordinated by the operation of CPU 10' work to move carrier #1 along carriage shaft 62 and also work to move material to be worked 114 such that the working tool 100 is moved against material to be worked 114 to accomplish its intended purposes. At the end of this working, CPU 10' can retract working tool 100 away from material to be worked 114 until the sensor 134 senses that once again housing body "A" 138 is sufficiently elevated to be placed in its "HOME" position. Once placed in its "HOME" position, housing body "A" 138 is ready to receive its next motor step signals from CPU 10'.

The methodology set forth immediately above applied to carrier assembly #1 is the same methodology that is applied by CPU 10' to operate carrier assembly #2.

The system of the present invention is elegant and simple. For example, there is no sophisticated feedback mechanism used or needed for detecting the absolute position of the various components in the drivetrain (122, 124, 126, 138, 122', 124', 126', 138') of each respective carrier assembly. Despite this lack of sophisticated feedback mechanism, because of the precise nature of the incremental moves carried by stepper motor 120, by bringing the housing body "A" 138, "B" 138' to their respective "HOME" positions before moving the respective tools to their working position; a high degree of accuracy can be achieved in obtaining a calibrated urging of working tools 100 against material to be worked 114.

What is claimed is:

1. An apparatus configured for working a workpiece, the apparatus comprising:
   a first working tool;
   a first motor coupled to the first working tool, wherein the first motor is configured for urging said first working tool along a first axis in a first direction against said workpiece;
   an electronic controller communicatively-coupled to said first motor;
   a manually-selectable workpiece characteristic selector communicatively-coupled to the electronic controller and is configured to send a manually-selected workpiece characteristic signal of a plurality of manually-selectable workpiece characteristic signals to the electronic controller, the manually-selected workpiece characteristic signal corresponding to a type of material from which the workpiece is formed; and
   a sensor communicatively-coupled to the electronic controller, wherein the sensor is configured to detect a position of the first working tool along the first axis,
   wherein the electronic controller is configured to:
      translate the manually-selected workpiece characteristic signal into a calibrated force signal;
      receive a sensed signal from the sensor corresponding to the position of the first working tool; and
      based on the sensed signal, send the calibrated force signal to said first motor whereby said first motor drives the first working tool downward against said workpiece with a force in proportion to said calibrated force signal.

2. The apparatus of claim 1, wherein the first direction is perpendicular to the workpiece.

3. The apparatus of claim 1, further comprising a drive roller configured to move the workpiece in a second direction perpendicular to the first direction.

4. The apparatus of claim 1, wherein the first working tool is at least one of a scriber, an embosser, a cutting blade, or an ink based marker, wherein working the workpiece includes scribing the workpiece with the scriber, embossing the workpiece with the embosser, cutting the workpiece with the cutting blade, or writing on the workpiece with the ink based marker.

5. The apparatus of claim 1, further comprising a first rack and first pinion coupled between the first motor and the first working tool.

6. The apparatus of claim 5, wherein the first working tool and the first pinion are coupled together by way of a first downward urging member.

7. The apparatus of claim 6, wherein:
the first downward urging member is a downward urging spring; and
both the first rack and the downward urging spring are configured to move and compress/retract, respectively, along a common rack guide shaft.

8. The apparatus of claim 7, further comprising an upward urging spring configured to compress/retract along the common rack guide shaft.

9. The apparatus of claim 1, wherein the sensor is configured to at least indirectly sense an absolute position of the first working tool.

10. The apparatus of claim 1, further comprising:
a carriage assembly for carrying:
said first working tool and said first motor; and
a second working tool and a second motor,
wherein said second working tool is coupled to said second motor, and wherein said second motor urges said second working tool against said workpiece.

11. The apparatus of claim 10, wherein said first and second motors are mounted to a common carriage platform.

12. The apparatus of claim 1, wherein said first motor is a stepper motor.

13. The apparatus of claim 1, wherein said urging is performed with minimal pressure at the beginning of movement of said first working tool to allow said first working tool to swivel into optimal orientation before more pressure is applied.

14. The apparatus of claim 1, wherein the manually-selectable workpiece characteristic selector is a rotary dial including a plurality of indicia markings, wherein each indicia marking of the plurality of indicia markings corresponds to the type of material defining the workpiece that is worked by the first working tool.

15. The apparatus of claim 1, further comprising a CPU in communication with the electronic controller and the manually-selectable workpiece characteristic selector.

* * * * *